United States Patent
Kudo

(10) Patent No.: US 12,106,570 B2
(45) Date of Patent: Oct. 1, 2024

(54) MONITORING DEVICE, MONITORING METHOD, AND RECORDING MEDIUM

(71) Applicant: NEC Corporation, Tokyo (JP)

(72) Inventor: Yuta Kudo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/232,095

(22) Filed: Aug. 9, 2023

(65) Prior Publication Data

US 2023/0386215 A1 Nov. 30, 2023

Related U.S. Application Data

(63) Continuation of application No. 17/418,423, filed as application No. PCT/JP2020/000133 on Jan. 7, 2020, now Pat. No. 11,804,045.

(30) Foreign Application Priority Data

Jan. 11, 2019 (JP) .................. 2019-003514

(51) Int. Cl.
  *G06V 20/52* (2022.01)
  *G06T 7/20* (2017.01)
  *G06T 7/70* (2017.01)
  *G06V 40/10* (2022.01)
  *H04N 7/18* (2006.01)

(52) U.S. Cl.
  CPC ............... *G06V 20/52* (2022.01); *G06T 7/20* (2013.01); *G06T 7/70* (2017.01); *G06V 40/10* (2022.01); *H04N 7/183* (2013.01); *G06T 2207/30196* (2013.01); *G06T 2207/30232* (2013.01)

(58) Field of Classification Search
  None
  See application file for complete search history.

(56) References Cited

U.S. PATENT DOCUMENTS 9,729,788 B2 8/2017 Furumura et al.
2006/0165395 A1 7/2006 Shimano et al.
(Continued)

FOREIGN PATENT DOCUMENTS

JP 2007226351 A * 9/2007
JP 2008040758 A 2/2008
(Continued)

OTHER PUBLICATIONS

International Search Report for PCT Application No. PCT/JP2020/000133, mailed on Feb. 18, 2020.
(Continued)

*Primary Examiner* — Delomia L Gilliard

(57) ABSTRACT

To present a region which is not fully monitored, provided is a monitoring device comprising a detection means, an estimation means, a determination means, and a presentation means. The detection means detects a person from an image. The estimation means estimates a region which is being viewed by the person who is detected by the detection means. On the basis of the region estimated by the estimation means, the determination means determines a region which requires special attention within a monitoring area. The presentation means presents information indicating the region which requires special attention determined by the determination means.

15 Claims, 15 Drawing Sheets

(56) References Cited

U.S. PATENT DOCUMENTS

| | | |
|---|---|---|
| 2009/0303055 A1 | 12/2009 | Anderson et al. |
| 2012/0046857 A1 | 2/2012 | Mori et al. |
| 2015/0271415 A1 | 9/2015 | Uemura et al. |
| 2016/0104174 A1 | 4/2016 | Matsumoto et al. |
| 2017/0316259 A1 | 11/2017 | Hoy et al. |
| 2018/0012080 A1 | 1/2018 | Glaser et al. |
| 2018/0217590 A1 | 8/2018 | Kobayashi et al. |
| 2018/0247504 A1 | 8/2018 | Siminoff et al. |
| 2019/0080179 A1 | 3/2019 | Kimura |

FOREIGN PATENT DOCUMENTS

| | | | |
|---|---|---|---|
| JP | 2009251761 A | | 10/2009 |
| JP | 2010268158 A | | 11/2010 |
| JP | 2011048736 A | | 3/2011 |
| JP | 2013196388 A | * | 9/2013 |
| JP | 2018121267 A | | 8/2018 |
| JP | 2018137515 A | * | 8/2018 |
| WO | 2010131331 A1 | | 11/2010 |
| WO | 2016147704 A1 | | 9/2016 |

OTHER PUBLICATIONS

Japanese Office Action for JP Application No. 2020-565154 mailed on Sep. 20, 2022 with English Translation.

US Office Action for U.S. Appl. No. 18/230,515, mailed on Feb. 29, 2024.

US Office Action for U.S. Appl. No. 18/230,516, mailed on Mar. 4, 2024.

US Office Action for U.S. Appl. No. 18/232,179, mailed on Feb. 29, 2024.

Tobias Senst et al., "Crowd analysis in non-static cameras using feature tracking and multi-person density", ICIP2014, Oct. 2014, pp. 6041-6045.

Wenhua Ma et al., "Crowd Density Analysis Using Co-occurrence Texture Features", 2011, pp. 170-175.

* cited by examiner

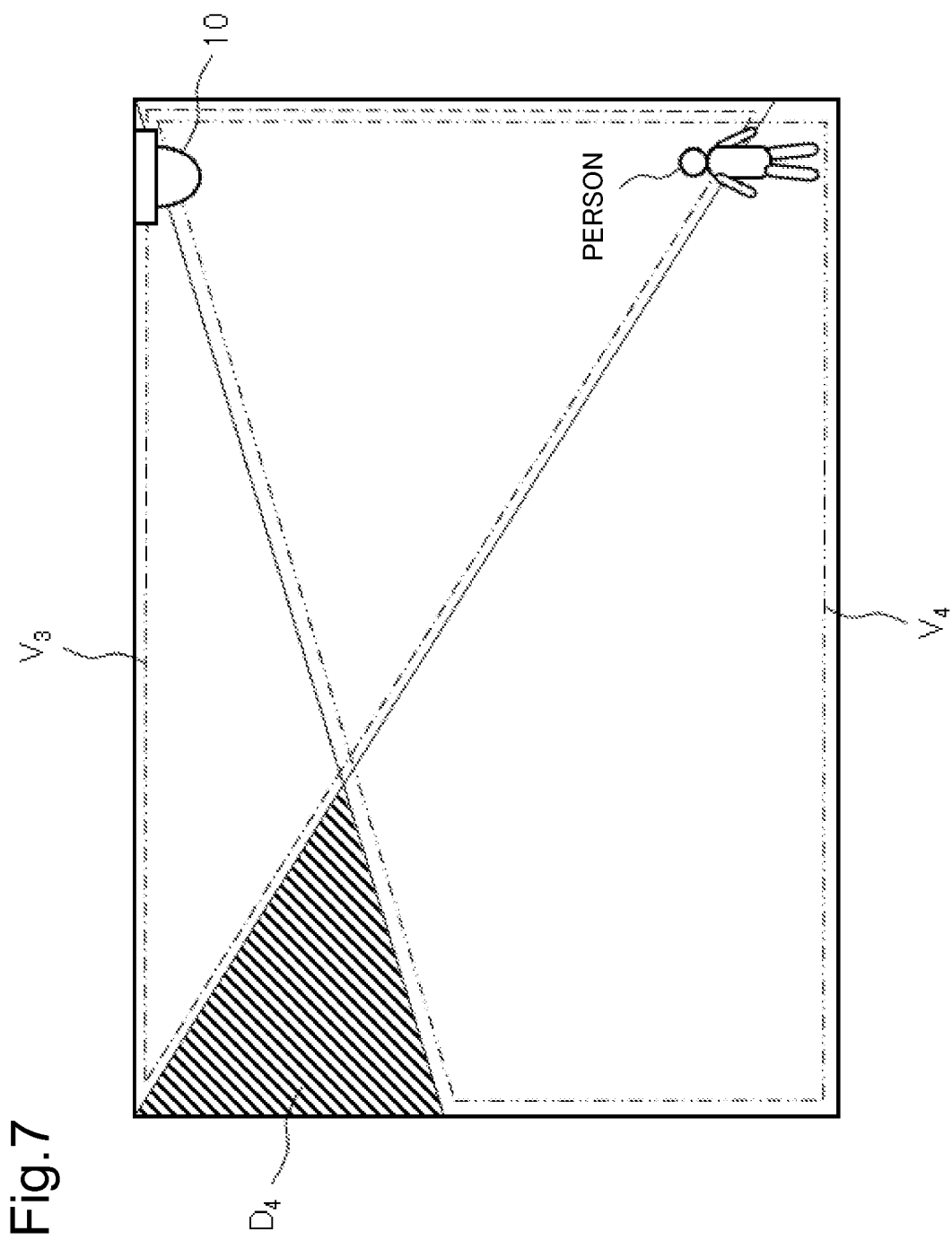

Fig.9
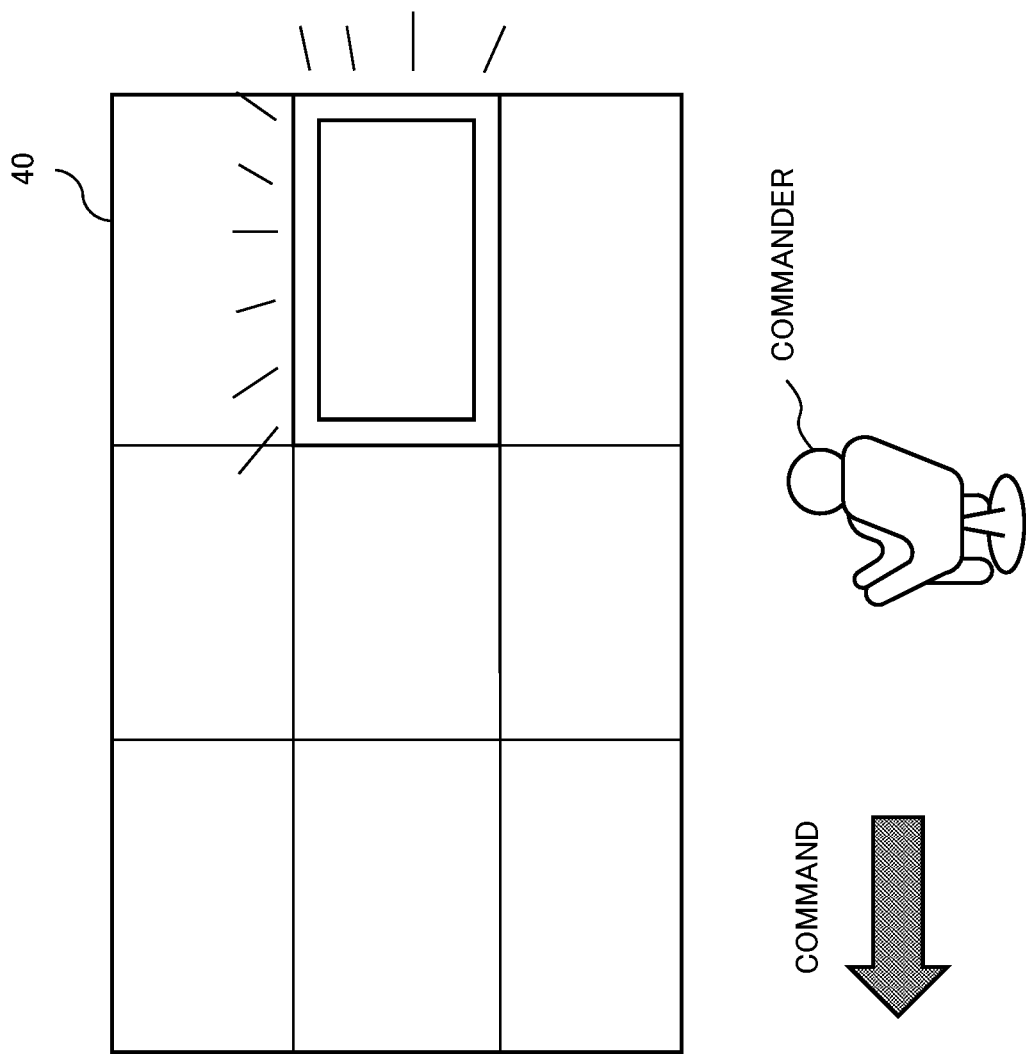
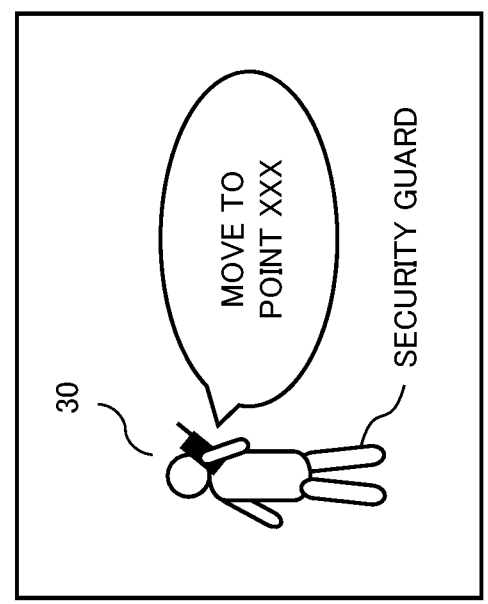

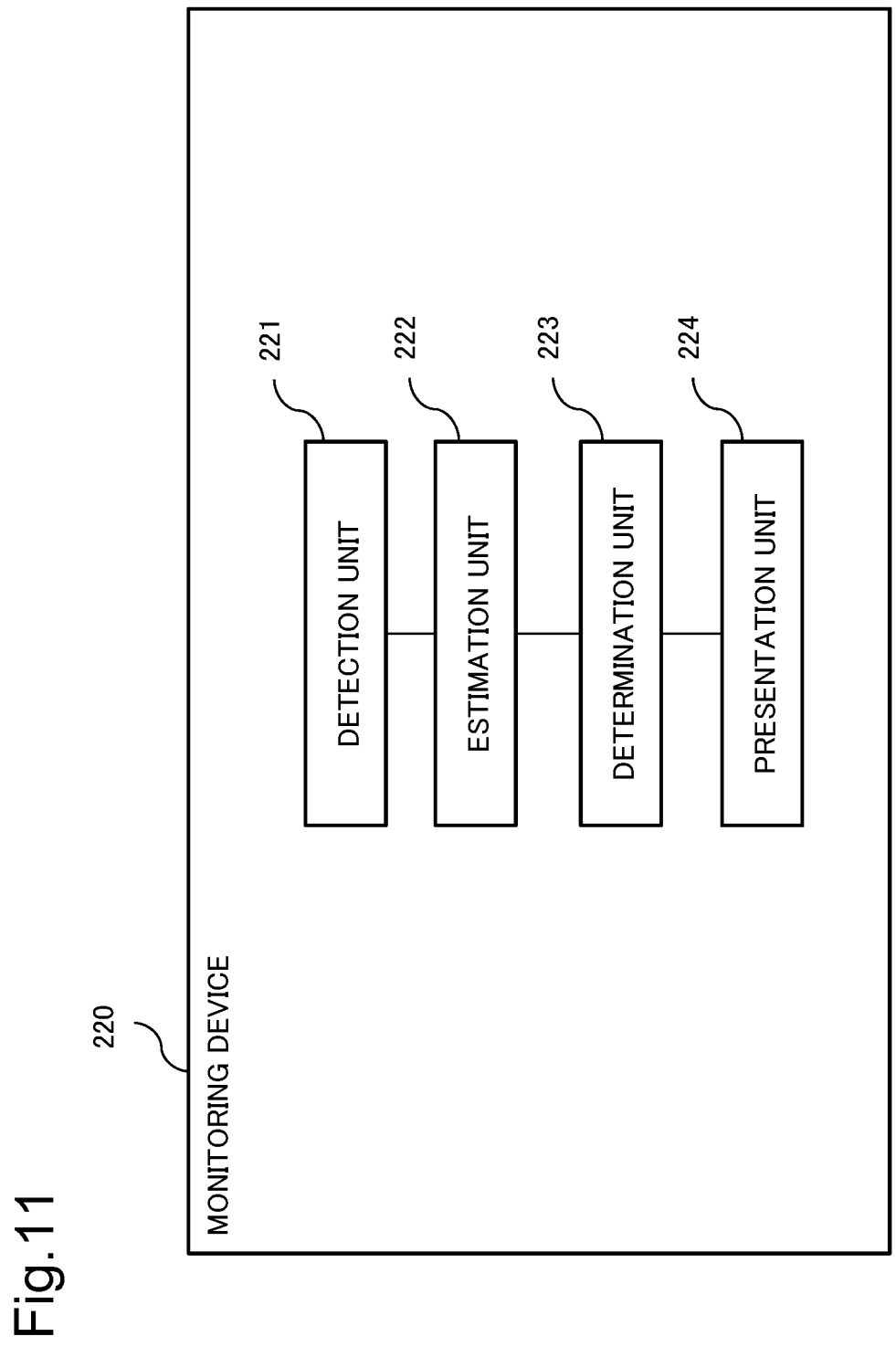

MONITORING DEVICE, MONITORING METHOD, AND RECORDING MEDIUM

CROSS-REFERENCE TO RELATED APPLICATIONS

This application is a Continuation application of U.S. patent application Ser. No. 17/418,423 filed on Jun. 25, 2021, which is a National Stage of International Application No. PCT/JP2020/000133, filed on Jan. 7, 2020, claiming priority to Japanese Patent Application No. 2019-003514, filed on Jan. 11, 2019, the contents of all of which are incorporated herein by reference in their entirety.

TECHNICAL FIELD

The disclosure relates to a monitoring device, a monitoring method, and a recording medium, and for example, relates to a monitoring device that analyzes a video captured by a monitoring camera to support monitoring in a monitoring area by a security guard or another person.

BACKGROUND ART

In a case where a security guard monitors a monitoring area, for example, monitoring in which the security guard monitors a video in which the monitoring area is captured by a monitoring camera and monitoring performed by the security guard patrolling in the monitoring area are jointly used.

FIG. 13 is a diagram explaining a monitoring system 1000 described in PTL 1. As illustrated in FIG. 13, when a blind spot due to an obstacle is produced in the field of view of a monitoring camera, the monitoring system 1000 described in PTL 1 detects that a person has come into the blind spot and makes a notification to that effect. This allows, for example, a security guard who uses the monitoring system 1000 to find a suspicious person present in the blind spot in a video captured by the monitoring camera.

CITATION LIST

Patent Literature

[PTL 1] WO 2016/147704 A
[PTL 2] JP 2011-048736 A
[PTL 3] JP 2009-251761 A
[PTL 4] WO 2010/131331 A

SUMMARY OF INVENTION

Technical Problem

Depending on the orientation of the line of sight or the face of the security guard, the blind spot of the security guard varies, and accordingly, a region out of the field of view of the security guard can be produced. In the prior art described in PTL 1, since the field of view of the security guard is not considered and therefore a blind spot out of the field of view of the security guard cannot be detected, there is a possibility of overlooking a suspicious person present in the blind spot of the security guard or suspicious behavior that has occurred in the blind spot of the security guard.

PTLs 2 to 4 do not disclose presenting a region out of the field of view of the security guard in relation to the monitoring system.

It is a primary object of the disclosure to present a region that is not fully monitored.

Solution to Problem

In order to solve the above problem, a monitoring device according to one aspect of the disclosure includes: a detection unit that detects a person from an image; an estimation unit that estimates a region that is being viewed by the detected person; a determination unit that determines, based on the estimated region, a region that requires special attention within a monitoring area; and a presentation unit that presents information indicating the determined region that requires special attention.

In order to solve the above problem, a monitoring method according to one aspect of the disclosure includes: detecting a person from an image; estimating a region that is being viewed by the detected person; determining, based on the estimated region, a region that requires special attention within a monitoring area; and presenting information indicating the determined region that requires special attention.

In order to solve the above problem, a recording medium according to one aspect of the disclosure stores a program that causes a computer to execute: detecting a person from an image; estimating a region that is being viewed by the detected person; determining, based on the estimated region, a region that requires special attention within a monitoring area; and presenting information indicating the determined region that requires special attention.

Advantageous Effects of Invention

According to one aspect of the disclosure, a region that is not fully monitored can be presented.

BRIEF DESCRIPTION OF DRAWINGS

FIG. 7 is a diagram explaining still another example of the blind spot region.

FIG. 9 is a diagram illustrating an example of a monitoring monitor of the monitoring system according to the first example embodiment.

FIG. 11 is a block diagram illustrating an example of a configuration of a monitoring device according to a fourth example embodiment.

EXAMPLE EMBODIMENT

First Example Embodiment

A first example embodiment of the disclosure will be described below with reference to FIGS. 1 to 9.

Monitoring System 1

Figure 1:
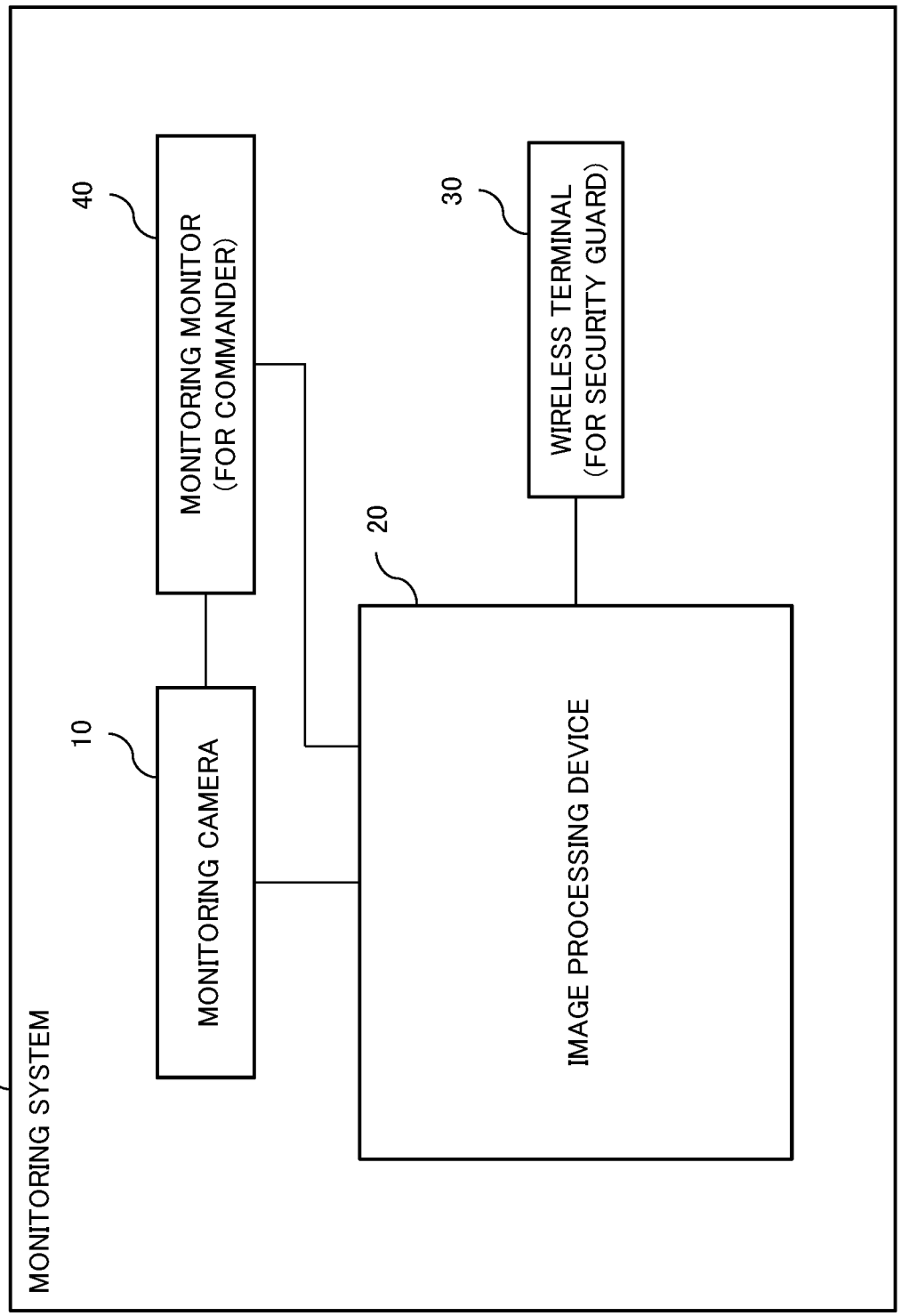
FIG. 1 is a block diagram illustrating an example of a configuration of a monitoring system according to a first example embodiment.

FIG. 1 is a block diagram illustrating a configuration of a monitoring system 1 according to the present first example embodiment. The monitoring system 1 is used, for example, to monitor an event venue, a game hall, a resort, or a public place. As illustrated in FIG. 1, the monitoring system 1 includes a monitoring camera 10, an image processing device 20, a wireless terminal 30 (for a security guard), and a monitoring monitor 40. The image processing device 20 is an example of a monitoring device.

The number of monitoring cameras 10 can be one or more. The orientation of the monitoring camera 10 may be fixed or movable. The monitoring camera 10 captures an image of a space to be monitored (referred to as a monitoring area). The monitoring camera 10 according to the present example embodiment can capture a moving image. The monitoring camera 10 transmits data of a captured video (including a moving image) to the image processing device 20 and the monitoring monitor 40.

The image processing device 20 analyzes the video captured by the monitoring camera 10, and outputs an analysis result to the monitoring monitor 40. Specifically, the image processing device 20 estimates a region (hereinafter referred to as a blind spot region) in the monitoring area out of the field of view of a person, in accordance with a flow to be described later. The blind spot region is an example of a region that requires special attention, and is included in a region that is not viewed by the person. The field of view here indicates a region that can be viewed by the person.

The image processing device 20 transmits information indicating the blind spot region to the monitoring monitor 40 in a wireless or wired manner. The image processing device 20 also has a function of catching a person who entered the blind spot region or an object left in the blind spot region, and when catching such a person or object, notifies the wireless terminal 30 of information relating to the catching by wireless communication. A process executed by the image processing device 20 will be described in detail later.

The wireless terminal 30 has a wireless communication function, and can perform wireless communication with the image processing device 20. The wireless terminal 30 may be, for example, a transceiver. The wireless terminal 30 is carried or worn by a security guard. The security guard may further carry or wear an imaging device. Alternatively, the wireless terminal 30 may include an imaging unit. In this case, data of a video captured by the imaging device or the imaging unit is transmitted to the monitoring monitor 40 via the image processing device 20 by wireless communication.

The monitoring monitor 40 is always connected to the monitoring camera 10, and displays a video captured by the monitoring camera 10 in real time. The monitoring monitor 40 also displays a video captured by the imaging device carried or worn by the security guard. Normally, a person who issues a command to the security guard (referred to as a commander) gazes at the video of the monitoring area displayed on the monitoring monitor 40.

Image Processing Device 20

Figure 2:
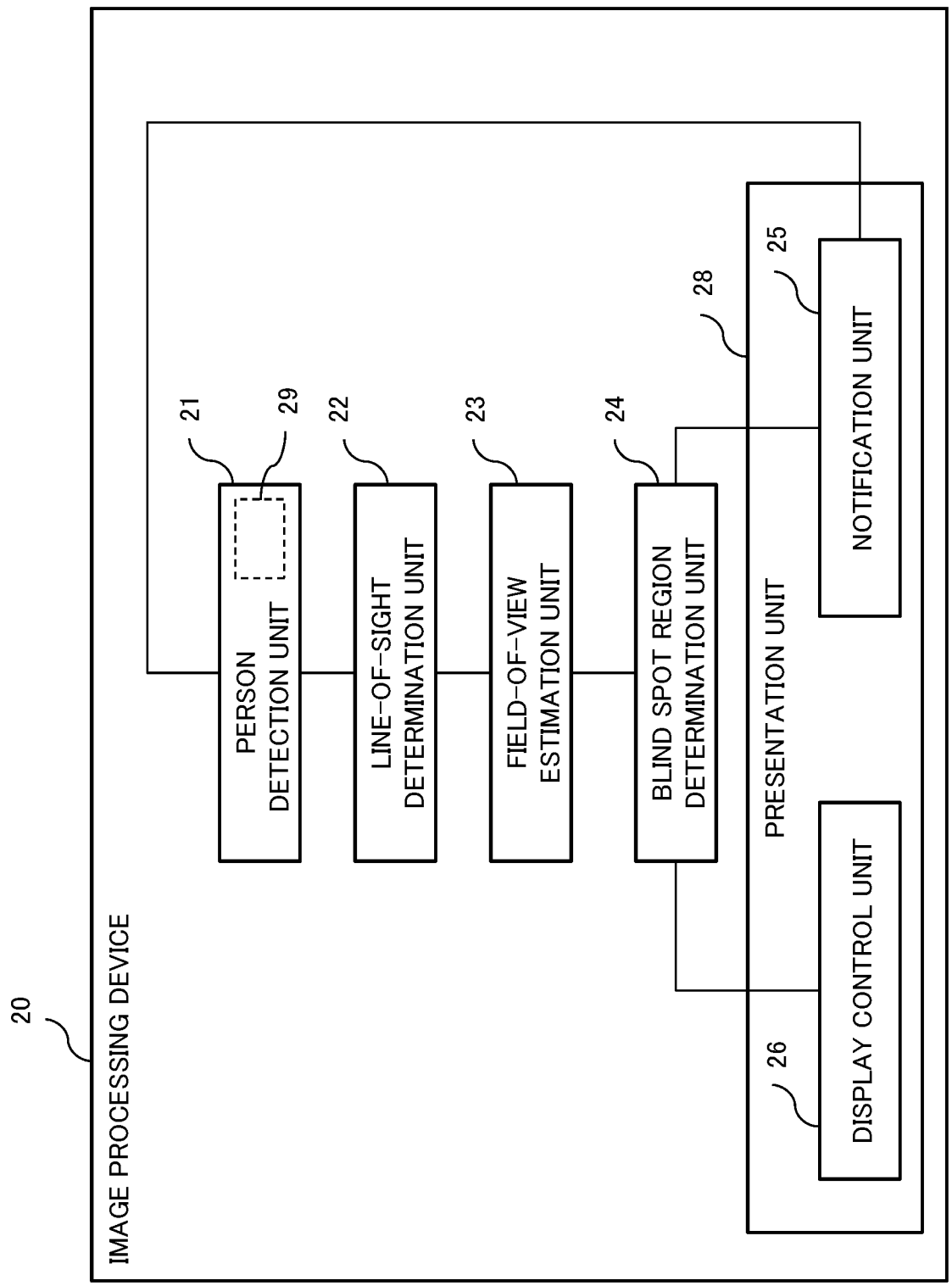
FIG. 2 is a block diagram illustrating an example of a configuration of an image processing device included in the monitoring system according to the first example embodiment.

FIG. 2 is a block diagram illustrating a configuration of the image processing device 20. As illustrated in FIG. 2, the image processing device 20 includes, as functional units, a person detection unit 21, a line-of-sight determination unit 22, a field-of-view estimation unit 23, a blind spot region determination unit 24, and a presentation unit 28. Furthermore, the presentation unit 28 includes a notification unit 25 and a display control unit 26. The person detection unit 21 is an example of a detection means. The field-of-view estimation unit 23 is an example of an estimation means. The blind spot region determination unit 24 is an example of a determination means. The presentation unit 28 is an example of a presentation means.

Hereinafter, an example of a process executed by the image processing device 20 (hereinafter referred to as a blind spot region determination process) will be described. At the same time, an example of each operation executed by the multiple functional units of the image processing device 20 illustrated in FIG. 2 will also be described.

Blind Spot Region Determination Process

Figure 3:
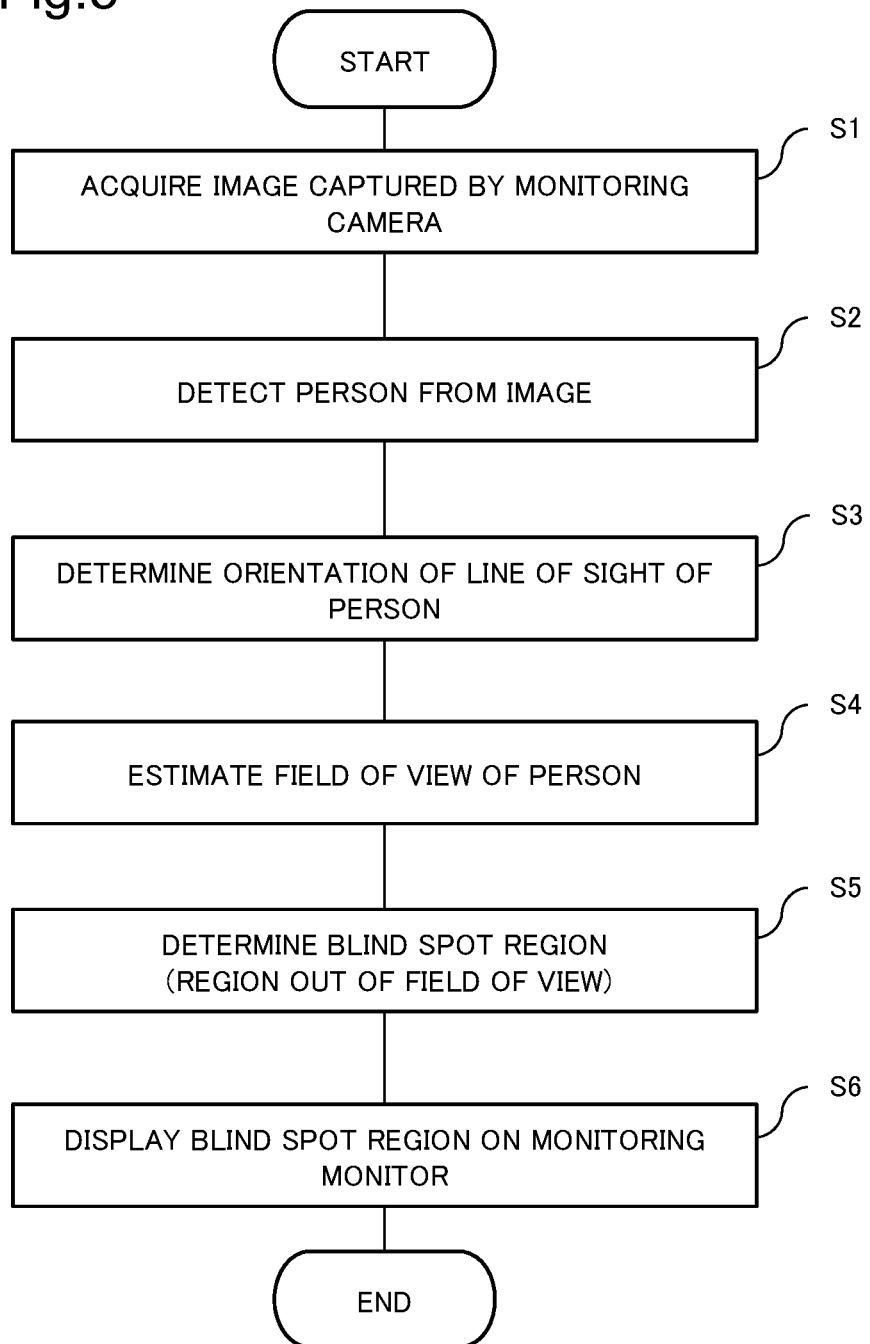
FIG. 3 is a flowchart illustrating a flow of a process executed by the image processing device according to the first example embodiment.

With reference to FIG. 3, the flow of the blind spot region determination process executed by the image processing device 20 will be described together with the operation of each functional unit of the image processing device 20. FIG. 3 is a flowchart illustrating a flow of the blind spot region determination process.

As illustrated in FIG. 3, the person detection unit 21 of the image processing device 20 acquires data of a video (here, a moving image is assumed) captured by the monitoring camera 10 (S1).

Then, the person detection unit 21 detects a region of a person from a plurality of images (frame images) constituting the acquired video, and further detects a region of the face of the person from the region of the person in the images (S2).

The line-of-sight determination unit 22 detects, for example, a pupil of the person from the region of the face of the person extracted from the images by the person detection unit 21. In addition, the line-of-sight determination unit 22 also determines the orientation of the face of the person detected by the person detection unit 21. The line-of-sight determination unit 22 calculates the orientation of the line of sight from the orientation of the face of the person and the position of the pupil in the eye (S3).

Figure 4:
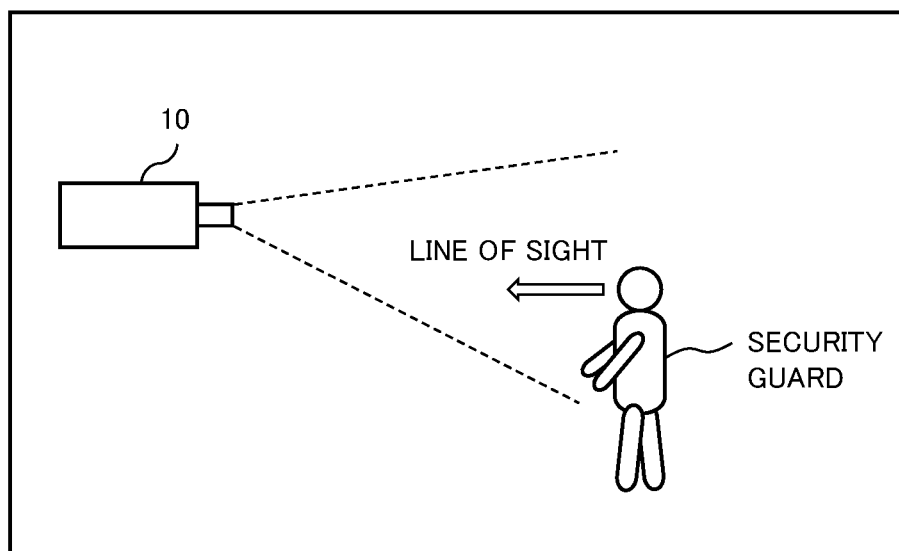
FIG. 4 is a diagram explaining an example of a method of determining a line of sight of a person.

FIG. 4 illustrates an example of a method of determining a line of sight of the person. In the present example embodiment, the line-of-sight determination unit 22 extracts a region of an eye of the person from the image region of the face of the person detected by the person detection unit 21 from the captured image including the person taken by the monitoring camera 10. Then, the line-of-sight determination unit 22 determines the line of sight of the person using an eye tracking technology. The eye tracking technology employed here is not limited, and the description thereof will be omitted. The line-of-sight determination unit 22 can also determine the orientation of the line of sight of the person, using an image of the person captured by a second camera different from the monitoring camera 10 (see a second example embodiment).

The field-of-view estimation unit 23 estimates the field of view of the person from the orientation of the line of sight and the face of the person determined by the line-of-sight determination unit 22 (S4). In more detail, the field-of-view estimation unit 23 estimates the field of view of the person detected by the person detection unit 21, based on the orientation of the line of sight and the face of the person, and angle information representing the field of view of the person given in advance. The field of view represents a range that a person can see with an eye of the person.

In the present example embodiment, the angle information representing the field of view of the person (hereinafter referred to as field-of-view angle information) stored in advance by the image processing device 20 is angle information on the field of view of an average person (for example, about 180 degrees in the horizontal direction and about 60 degrees in the vertical direction).

The blind spot region determination unit 24 determines a region out of the field of view of the person estimated by the field-of-view estimation unit 23 in the monitoring area (S5). At this time, the region determined by the blind spot region determination unit 24 is referred to as a blind spot region. The blind spot region is not limited only to the region out of the field of view of the person. Some examples of the blind spot region will be described later.

The display control unit 26 displays information indicating the blind spot region determined by the blind spot region determination unit 24 on the monitoring monitor 40 (S6). An example of the presentation of the blind spot region will be indicated later. The notification unit 25 of the image processing device 20 may issue an alert to the wireless terminal 30 carried or worn by the security guard to notify the wireless terminal 30 that the monitoring area contains a blind spot region. Thus, the blind spot region determination process ends.

As described above, the image processing device 20 analyzes the image acquired from the monitoring camera 10 to determine the blind spot region, and displays information on the blind spot region on the monitoring monitor 40. A person watching the monitoring monitor 40, for example, the commander, can check whether there is a suspicious person or a suspicious object in the blind spot region by gazing at the monitoring monitor 40, or can instruct a security guard to check the blind spot region. This is deemed to have an effect of suppressing an incident or an accident in the blind spot region.

First Modification of Blind Spot Region Determination Process

In one modification, in step S2 (the detection of the face of the person) in FIG. 3, the person detection unit 21 recognizes the face of a particular person (security guard) instead of any person, using an image captured by the monitoring camera 10. The security guard is a person who patrols in the monitoring area and checks whether a case such as an incident or an accident is occurred.

In the present modification, the person detection unit 21 collates the face image of the security guard stored in the image processing device 20 with the face of a person detected from an image captured by the monitoring camera 10. When the collation fails, that is, when the person detected from the image by the person detection unit 21 is not the security guard, the person detection unit 21 repeats the process in step S2 in FIG. 3.

On the other hand, when the collation is successful, the blind spot region determination process proceeds to step S3 in FIG. 3. The flow from step S3 in the present modification is as illustrated in FIG. 3. That is, the blind spot region of the security guard is determined, and the determined blind spot region is displayed on the monitoring monitor 40.

According to the configuration of the present modification, the blind spot region of the security guard is displayed on the monitoring monitor 40. Therefore, the commander gazing at the monitoring monitor 40 can easily know a region that is not fully monitored by the security guard. Then, the commander can issue an appropriate command to the security guard.

Second Modification of Blind Spot Region Determination Process

In another modification, after step S5 (the determination of the blind spot region) in FIG. 3, when the blind spot region determination unit 24 determines that there is a region that does not enter the field of view of a person (for example, the security guard) beyond a predetermined time, the blind spot region determination unit 24 instructs the notification unit 25 to make a notification. The notification unit 25 that accepted the instruction from the blind spot region determination unit 24 issues an alarm to the wireless terminal 30 carried by the security guard. This allows the security guard to know that there is a region desired to be viewed.

Third Modification of Blind Spot Region Determination Process

In still another modification, in step S4 (the estimation of the field of view of the person) in FIG. 3, the field-of-view estimation unit 23 may detect the orientation of the face of the person detected by the person detection unit 21, using an inertial sensor or an orientation sensor such as a gyro sensor (not illustrated) carried or worn on the head or the shoulder by the person. For example, the orientation of the face of the person may be detected by designating a reference direction in advance and working out a direction in which the face of the person moved from the reference direction, based on a value acquired by the inertial sensor and information on the reference direction. In this case, the field-of-view estimation unit 23 estimates that the orientation of the line of sight is the front of the face. The field-of-view estimation unit 23 estimates the field of view of the person, based on the orientation of the line of sight estimated in this manner and the field-of-view angle information on an average human.

In the present modification, the line-of-sight determination unit 22 does not need to determine the orientation of the line of sight of the person.

Fourth Modification of Blind Spot Region Determination Process

In still another modification, in step S4 (the estimation of the field of view of the person) in FIG. 3, the field-of-view estimation unit 23 estimates a region viewed by the person, based on the flow line of the person detected by the person detection unit 21.

In the present modification, the person detection unit 21 includes a tracking unit 29. That is, the person detection unit 21 detects the image region of the person and tracks the person in the detected image region in step S2 in FIG. 3 by the function of the tracking unit 29. The tracking unit 29 is an example of a tracking means. Then, the person detection unit 21 sends a result of tracking the person (including flow line information) to the field-of-view estimation unit 23. The field-of-view estimation unit 23 estimates a predetermined region near the position of the person as the field of view of the person.

In the present modification, as the person moves, the field of view of the person also moves.

Also in the present modification, step S3 (the determination of the line of sight of the person) in FIG. 3 is omitted. That is, in the present modification, the line-of-sight determination unit 22 does not need to determine the orientation of the line of sight or the face of the person.

Example of Blind Spot Region

Some examples of the above-described blind spot region will be described below.

Specific Example 1 of Blind Spot Region

Figure 5:
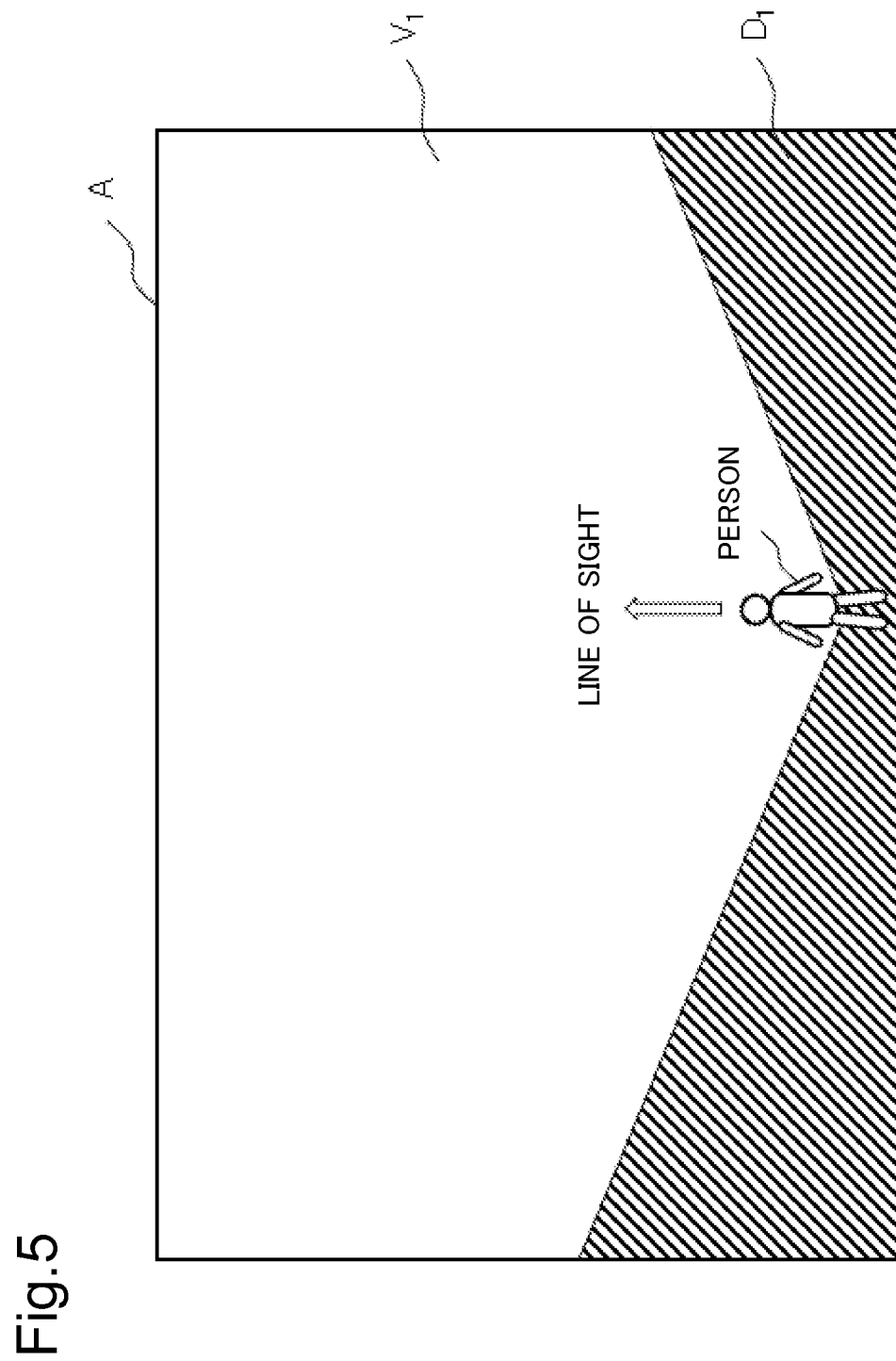
FIG. 5 is a diagram explaining an example of a blind spot region.

FIG. 5 is a diagram illustrating an example of the blind spot region. A person can view regions of each up to about 50 degrees on both of the left and right sides with the orientation of the line of sight of the person as the center. The region that can be viewed by the person is referred to as a field of view of the person. In the example illustrated in FIG. 5, in the monitoring area, a region $V_1$ (an unhatched region in FIG. 5) extending ahead of the person represents the field of view of the person. In FIG. 5, a region $D_1$ illustrated as hatched region denotes the blind spot region in the present example. A rectangular frame line A surrounding the person represents the monitoring area. That is, in the monitoring area, a region (the hatched region in FIG. 5) out of the field of view of the person corresponds to the blind spot region in the present example.

Specific Example 2 of Blind Spot Region

Figure 6:
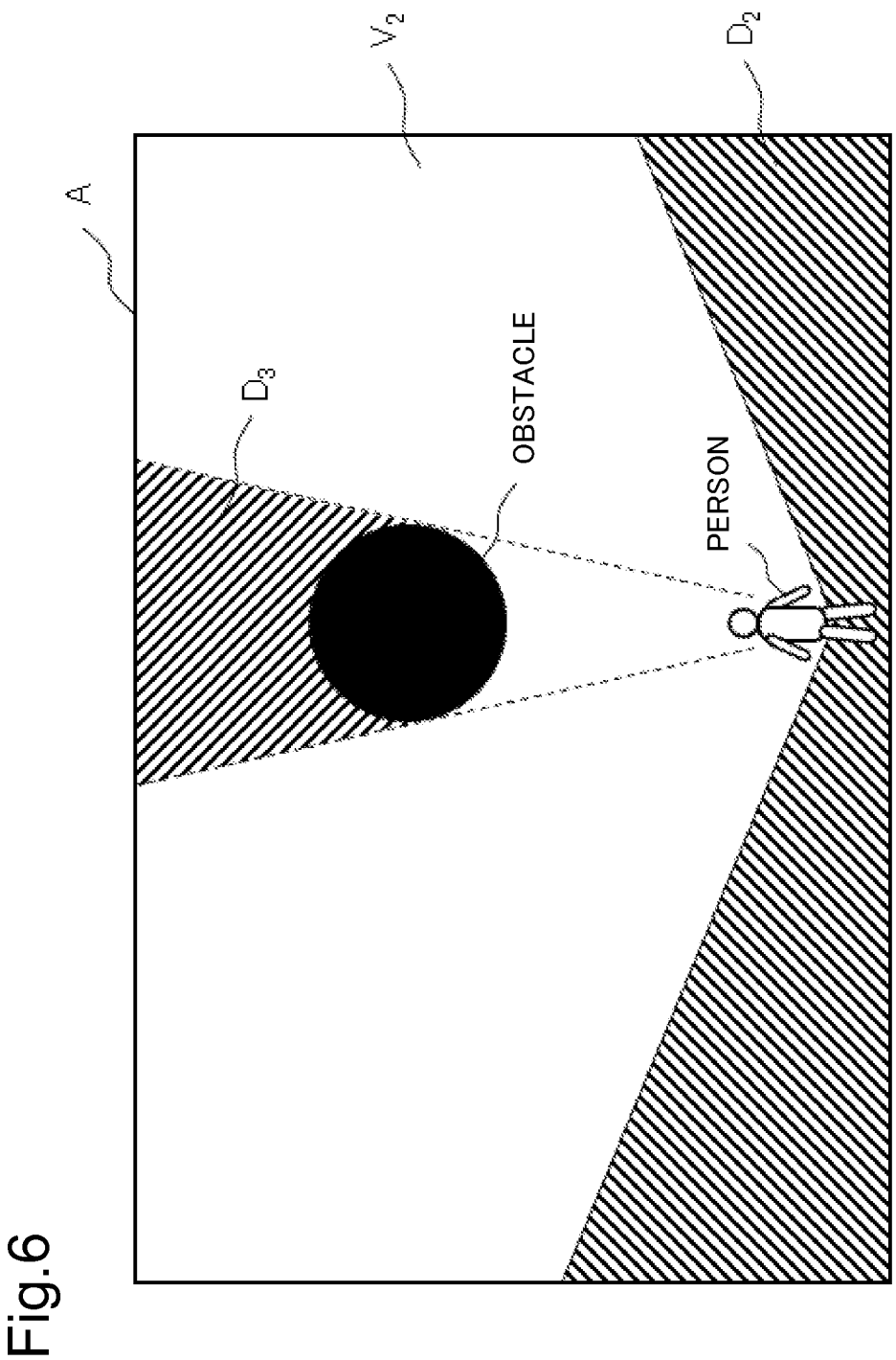
FIG. 6 is a diagram explaining another example of the blind spot region.

FIG. 6 is a diagram illustrating another example of the blind spot region. In the example illustrated in FIG. 6, similarly to the example illustrated in FIG. 5, a rectangular frame line A surrounding the person represents the monitoring area. Then, in FIG. 6, a region $D_2$ out of the field of view of the person denotes a first blind spot region, and an unhatched area $V_2$ denotes the field of view of the person. In addition, in the example illustrated in FIG. 6, a region $D_3$ that is invisible from the person due to the line of sight of the person being blocked by an obstacle denotes a second blind spot region. The first blind spot region $D_2$ and the second blind spot region $D_3$ are also examples of the region that requires special attention, and are included in regions that are not viewed by the person.

For example, the blind spot region determination unit 24 of the image processing device 20 detects an object present in the monitoring area or in the field of view of the person, that is, an obstacle, from a video captured by the monitoring camera 10. Then, the blind spot region determination unit 24 determines a region shielded from the line of sight of the person by the obstacle, as the second blind spot region $D_3$ illustrated in FIG. 6.

Specific Example 3 of Blind Spot Region

FIG. 7 is a diagram illustrating still another example of the blind spot region. In the example illustrated in FIG. 7, a region $V_3$ surrounded by a dashed-dotted line represents the field of view of the person, and a region $V_4$ surrounded by a dashed-double-dotted line represents the field of view of the monitoring camera 10. A region $D_4$ outside the field of view of the person and also outside the field of view of the monitoring camera 10 denotes the blind spot region. In other words, a region that cannot be viewed by the person and also by the commander or the like (see FIG. 9) gazing at the monitoring monitor 40 corresponds to the blind spot region in the present example.

In the present example, for example, information on the orientation of the monitoring camera 10 resolved according to the installation form of the monitoring camera 10 is given in advance to the monitoring camera 10, and the blind spot region determination unit 24 of the image processing device 20 acquires that information from the monitoring camera 10 to determine the field of view of the monitoring camera 10, based on the acquired information. Then, the blind spot region determination unit 24 determines a region that is out of the field of view of the person and also out of the field of view of the monitoring camera 10 that captures an image of the monitoring area, as a blind spot region.

Specific Example 1 of Presentation of Blind Spot Region

Specific examples of the presentation of the blind spot region by the display control unit 26 will be described with reference to FIGS. 8A to 8E. FIGS. 8A to 8E illustrate maps of the monitoring area displayed on a screen of a display apparatus by the display control unit 26. The display apparatus may be the monitoring monitor 40 or another display apparatus (not illustrated). For example, the screens illustrated in FIGS. 8A to 8E are displayed on a display device carried by a person (security guard) patrolling in the monitoring area.

In the present example, the blind spot region varies as the person moves in the monitoring area. At this time, even if a region that entered the field of view of the person thereafter becomes out of the field of view of the person, the region is not presented as a blind spot region within a predetermined time. FIGS. 8A to 8E are arranged in time series in this order. In FIGS. 8A to 8E, the blind spot region is indicated as a hatched region. An obstacle is indicated as a filled region. The relationship between the field of view of the person, the obstacles, and the blind spot regions in FIGS. 8A to 8E is an example. The field of view of the person illustrated in the present example is an example and is not restricted to the present example.

Figure 8A:
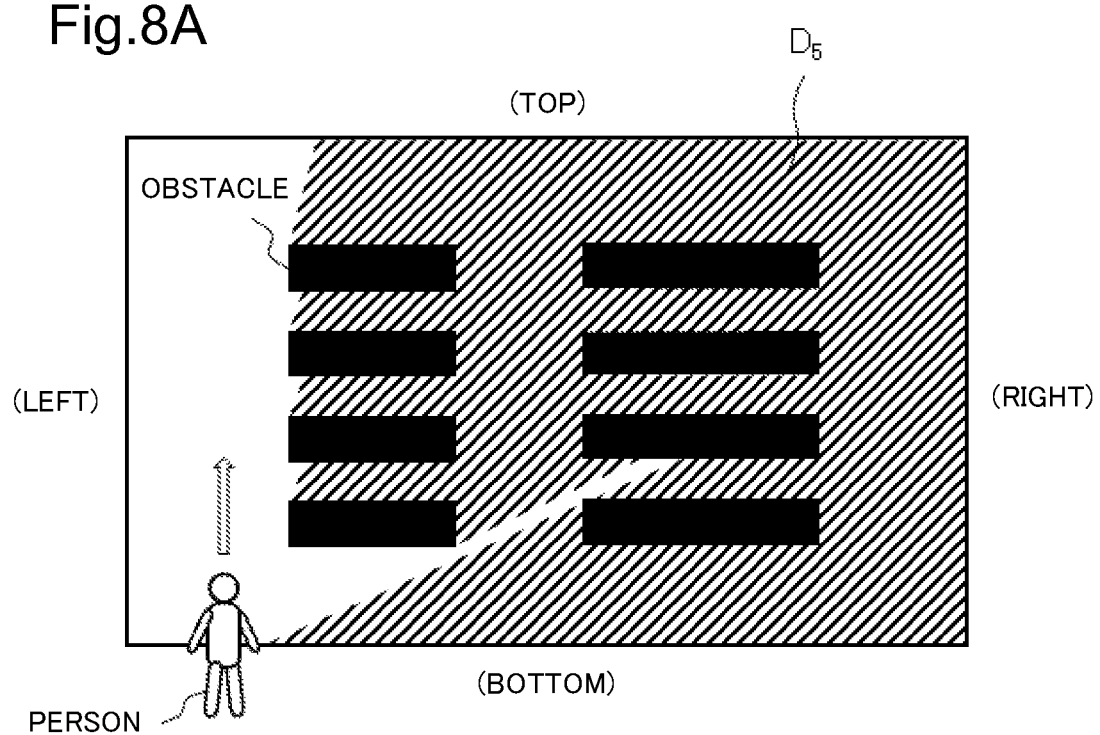
FIG. 8A is a diagram explaining an example of the presentation of the blind spot region.

In FIG. 8A, the person is present at the lower left of the monitoring area in the drawing. An arrow in FIG. 8A represents the line of sight of the person. The person is looking at the upper left side of the monitoring area in the drawing. The blind spot region at this time is denoted by a hatched region $D_5$ obtained by excluding the left side of the monitoring area in the drawing.

Figure 8B:
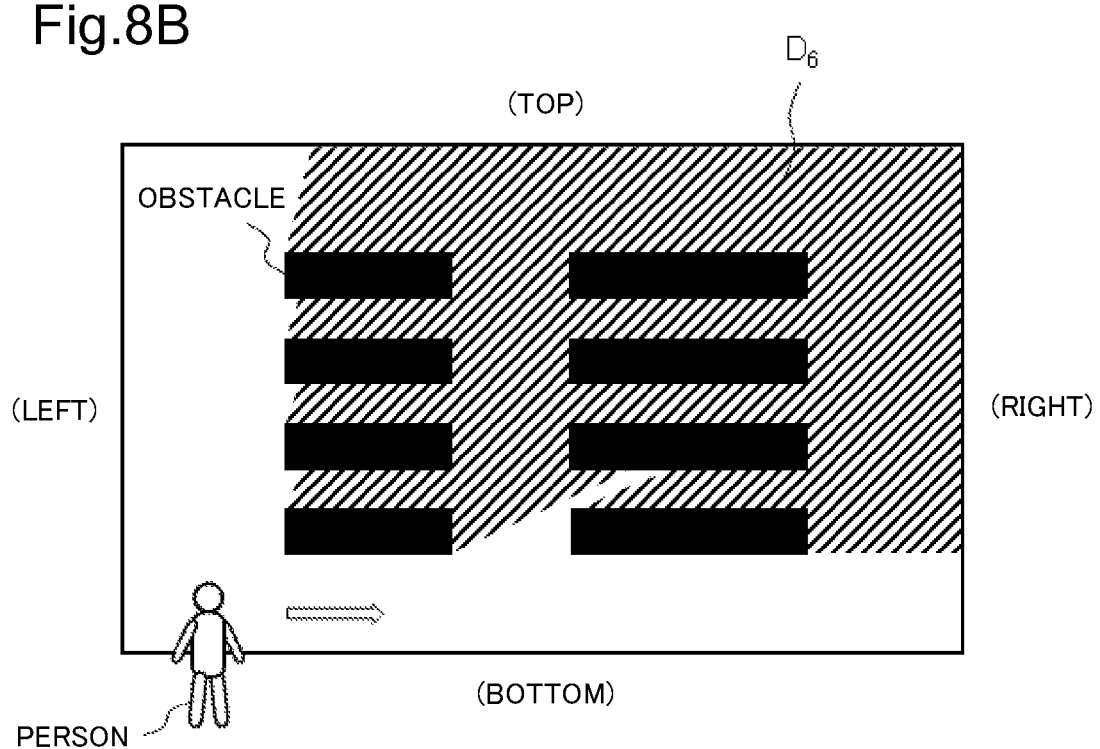
FIG. 8B is a diagram explaining an example of the presentation of the blind spot region.

In FIG. 8B, the person stays at the lower left of the monitoring area in the drawing. An arrow in FIG. 8B faces the right side in the drawing. That is, the person is looking at the lower right of the monitoring area in the drawing. The blind spot region at this time is denoted by a hatched region $D_6$ containing a central portion and the upper right of the monitoring area in the drawing.

Figure 8C:
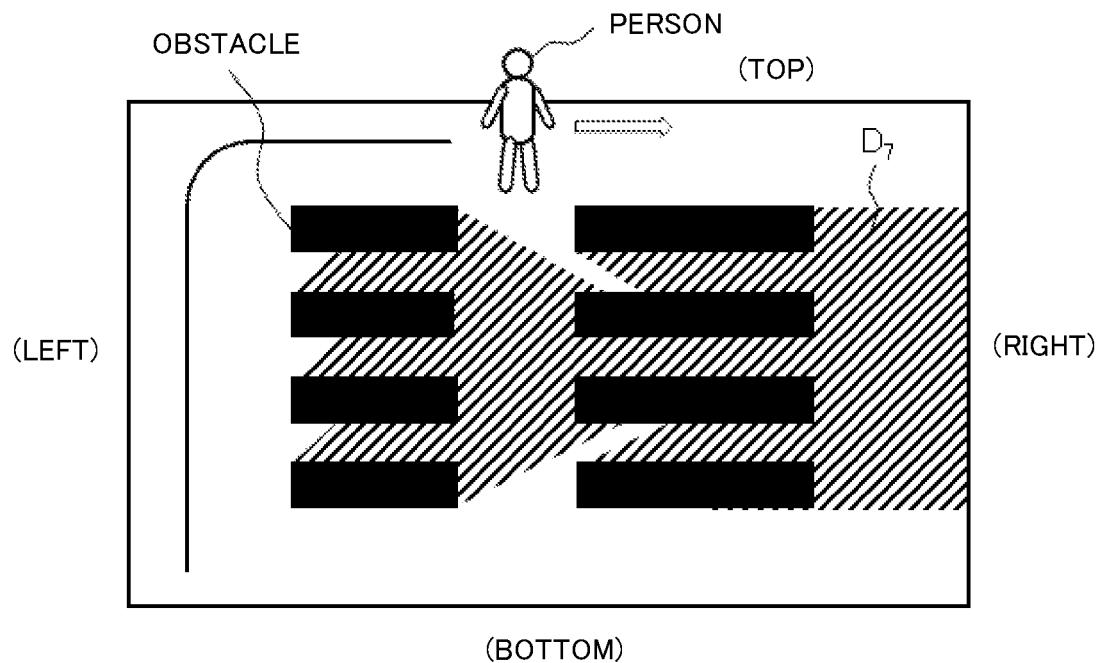
FIG. 8C is a diagram explaining an example of the presentation of the blind spot region.

In FIG. 8C, the person is moving to the upper side of a central portion of the monitoring area in the drawing. As indicated by an arrow in FIG. 8C, the person is looking at the upper right of the monitoring area in the drawing. The blind spot region at this time is denoted by a hatched region $D_7$ containing a central portion and the right side of the monitoring area in the drawing.

Figure 8D:
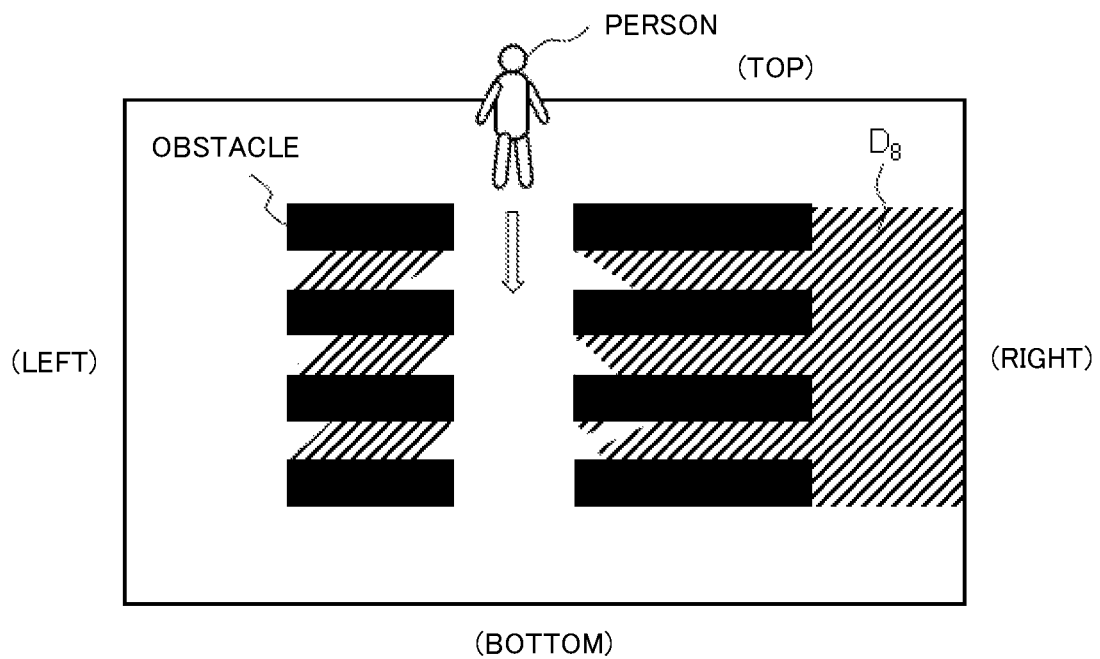
FIG. 8D is a diagram explaining an example of the presentation of the blind spot region.

In FIG. 8D, the person directs his/her line of sight toward the lower side of a central portion of the monitoring area in the drawing. The blind spot region at this time is denoted by a hatched region $D_8$ on the right side of the monitoring area in the drawing.

Figure 8E:
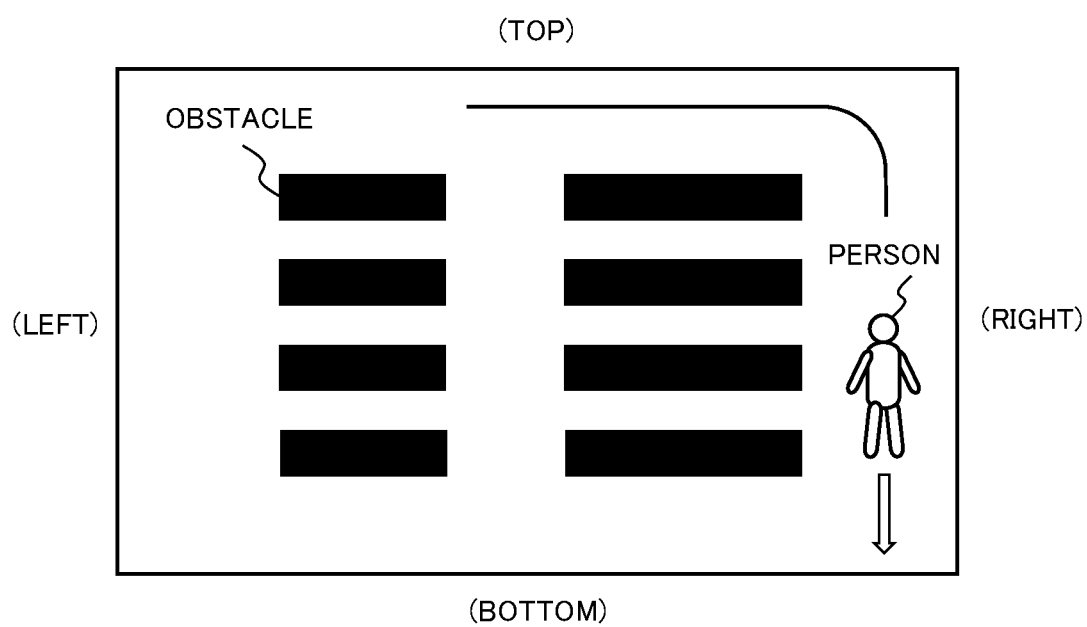
FIG. 8E is a diagram explaining an example of the presentation of the blind spot region.

In FIG. 8E, the person is moving to the lower right of the monitoring area in the drawing by passing through the upper right of the monitoring area in the drawing. No blind spot region remains.

In the present example, the person detection unit 21 of the image processing device 20 tracks the person. Every predetermined time or every time the orientation of the line of sight changes, the line-of-sight determination unit 22 calculates the real-time orientation of the line of sight of the person being tracked. The field-of-view estimation unit 23 estimates the field of view of the person being tracked every time the line-of-sight determination unit 22 calculates the orientation of the line of sight of the person.

The blind spot region determination unit 24 determines a region that is not viewed by the person being tracked within a predetermined time after the starting time point of tracking the person, based on the field of view of the person estimated by the field-of-view estimation unit 23. The blind spot region determination unit 24 converts the determined region in the real space that is not viewed by the person being tracked into a blind spot region as a region in the map of the monitoring area.

The display control unit 26 generates, for example, the screens illustrated in FIGS. 8A to 8E, based on information on the blind spot region converted into a region in the map of the monitoring area by the blind spot region determination unit 24, and displays the generated screens on the display device carried by the person. This allows the person to easily grasp an area that the person has not viewed yet, that is, the blind spot region, by checking the screens in FIGS. 8A to 8E displayed on the display device.

Second Specific Example of Presentation of Blind Spot Region

FIG. 9 is a diagram illustrating an example of the monitoring monitor 40 according to the present example embodiment. As illustrated in FIG. 9, the monitoring monitor 40 according to the present example embodiment is constituted by, for example, a plurality of display units. A plurality of monitoring cameras 10 captures images of the monitoring area from directions different from each other. The multiple display units of the monitoring monitor 40 simultaneously display videos received from the monitoring cameras 10 different from each other in real time. However, the monitoring monitor 40 may include only one display unit. In this case, the monitoring monitor 40 may sequentially display videos received from a plurality of monitoring cameras 10. In the present example, it is assumed that the entire monitoring area is displayed on the monitoring monitor 40 by the plurality of display units.

As described above in specific example 1, the blind spot region determination unit 24 determines a region that has not yet entered the field of view of the person, as a blind spot region, based on the field of view of the person estimated by the field-of-view estimation unit 23. The blind spot region determination unit 24 converts the determined blind spot region in the real space into a blind spot region in the map of the monitoring area displayed on the screen.

The blind spot region determination unit 24 specifies a display unit relevant to the blind spot region in the map of the monitoring area, based on a relationship between a display unit and a partial region in the map of the monitoring area displayed by this display unit. In other words, the blind spot region determination unit 24 specifies an image region showing the blind spot region from the entire image displayed by the monitoring monitor 40.

The display control unit 26 displays the image region showing the blind spot region specified by the blind spot region determination unit 24, on the monitoring monitor 40 in a more conspicuous mode or in a more emphasized manner than other image regions. In FIG. 9, the image region showing the blind spot region is emphasized by light emission or blinking.

By watching the monitoring monitor 40, the commander can quickly notice that a blind spot region occurred in the monitoring area. The commander can contact the wireless terminal 30 of the security guard using a communication device (not illustrated) and instruct the security guard located in or in the vicinity of the monitoring area to immediately check the blind spot region.

Second Example Embodiment

Another example embodiment of the disclosure will be described below.

In the present second example embodiment, a case where the monitoring system is used in a circumstance where a lifeguard keeps constant monitoring, such as a swimming pool or a swimming area, will be described. The basic configuration of a monitoring system according to the present second example embodiment is the same as the configuration of the monitoring system 1 according to the first example embodiment illustrated in FIG. 1.

Monitoring System 1 of Second Example Embodiment

In the present second example embodiment, a lifeguard of a swimming pool or a swimming area wears a cap-type or eyewear-type device 50a or 50b (see FIGS. 10A and 10B) having a wireless communication function.

Figure 10A:
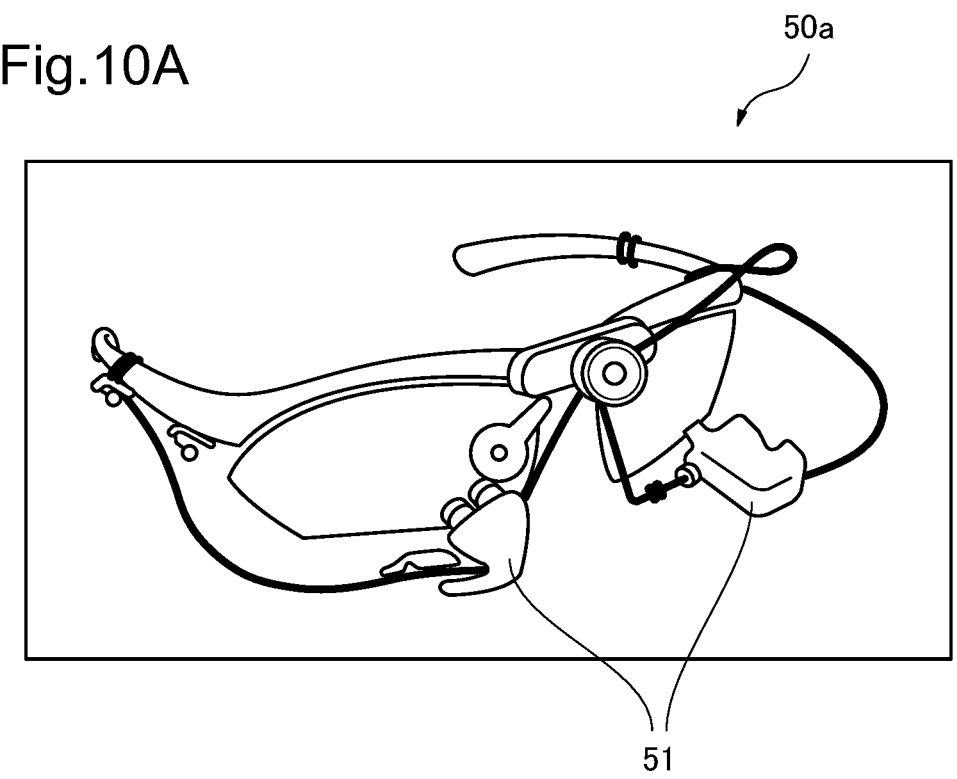
FIG. 10A is a view illustrating an example of an eyewear-type device including a compact camera according to a second example embodiment.
Figure 10B:
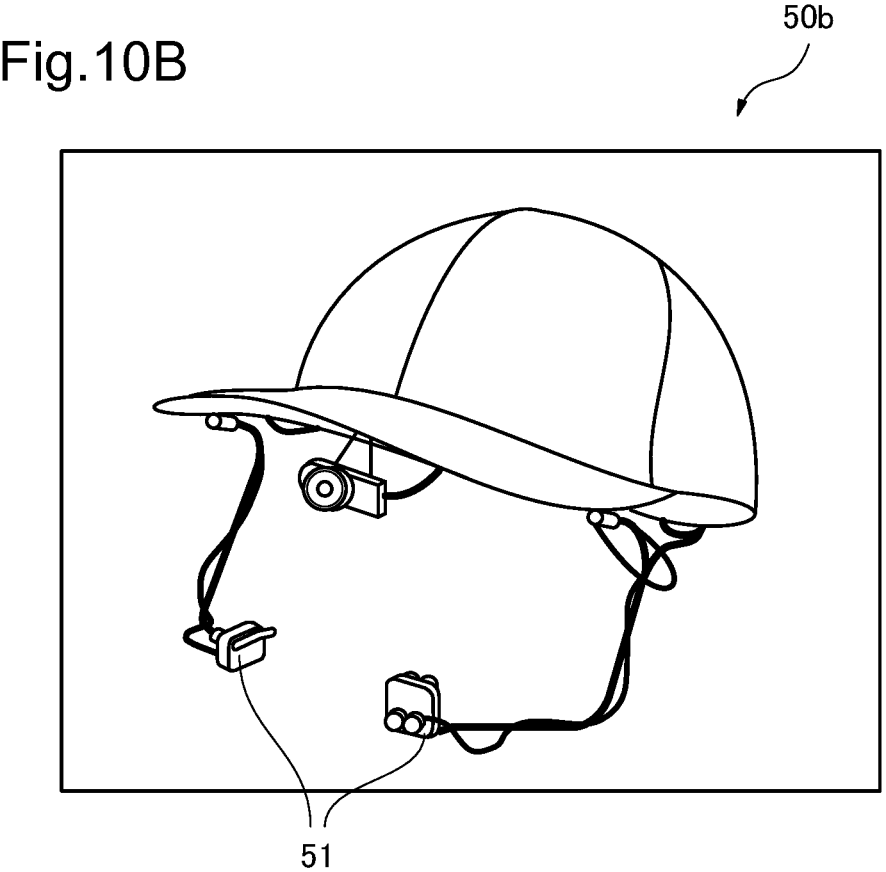
FIG. 10B is a view illustrating an example of a cap-type device including a compact camera according to the second example embodiment.

As illustrated in FIGS. 10A and 10B, the cap-type or eyewear-type device 50a or 50b includes a compact camera 51. The compact camera 51 faces the face of the lifeguard wearing the cap-type or eyewear-type device 50a or 50b. A line-of-sight determination unit 22 (see FIG. 2) of an image processing device 20 acquires, from the device 50a or 50b, an image in which the eye of the lifeguard and the surroundings of the eye are captured. Then, the line-of-sight determination unit 22 determines the line of sight of the lifeguard using an eye tracking technology.

As in the first example embodiment, a field-of-view estimation unit 23 estimates the field of view of the lifeguard, based on the line of sight of the lifeguard. Also as in the first example embodiment, a blind spot region determination unit 24 determines a blind spot region out of the field of view of the lifeguard, based on the field of view of the lifeguard. The blind spot region determination unit 24 sends information on the determined blind spot region to a notification unit 25.

The notification unit 25 detects a swimmer from a video captured by a monitoring camera 10. Then, when a swimmer is present in the blind spot region determined by the blind spot region determination unit 24, the notification unit 25 issues an alarm to the lifeguard.

Effects of Second Example Embodiment

According to the configuration of the present example embodiment, since the lifeguard can be made to notice a swimmer present in the blind spot region, the possibility of the occurrence of a water accident in the swimming pool or the swimming area can be reduced.

Application Example to Above-described First Example Embodiment

The method of determining the line of sight of a person described in the present second example embodiment can be applied to the above-described first example embodiment. That is, in step S3 (the determination of the line of sight of the person) of the blind spot region determination process illustrated in FIG. 3, the line-of-sight determination unit 22 may determine the line of sight of a person using an image captured by the compact camera 51 attached to the cap-type or eyewear-type device 50a or 50b worn by the person, instead of an image captured by the monitoring camera 10.

Third Example Embodiment

Another example embodiment of the disclosure will be described below.

In the present third example embodiment, a case where the monitoring system is used in a retail shop will be described. The basic configuration of a monitoring system according to the present third example embodiment is the same as the configuration of the monitoring system 1 according to the first example embodiment illustrated in FIG. 1.

In the present third example embodiment, a person detection unit 21 of an image processing device 20 detects a sales clerk present in a shop, which is a monitoring area. A field-of-view estimation unit 23 calculates the density of the number of sales clerks per partial region in the shop (hereinafter referred to as a density of sales clerks), and estimates a region having a higher density of sales clerks than a threshold value, as having been viewed by a sales clerk. A blind spot region determination unit 24 (see FIG. 2) determines a region having a lower density of sales clerks than the threshold value in the shop, as a blind spot region. The threshold value may be set in any manner. In the present third example embodiment, a line-of-sight determination unit 22 may not determine the line of sight of the sales clerk detected by the person detection unit 21.

The person detection unit 21 detects a customer (or a person apart from the sales clerks) in the blind spot region determined by the blind spot region determination unit 24, using information on the sales clerks given in advance. A notification unit 25 issues an alarm to a sales clerk or the like by an announcement, wireless communication, or the like, with the detection of a customer in a blind spot region by the person detection unit 21 as a trigger.

As described above, in the present third example embodiment, a region being viewed by a sales clerk is estimated based on the density of sales clerks. In a region having a higher density of sales clerks (than the threshold value), it is estimated that at least one sales clerk will notice the presence of a customer. On the other hand, in a region having a lower density of sales clerks (than the threshold value), there is a possibility that no sales clerk notices the presence of a customer. As a result, a situation in which a customer service is not provided to the customer for a long time can be produced. However, in the present third example embodiment, since the notification unit 25 issues an alarm to a sales clerk in a region having a lower density of sales clerks than the threshold value, it is possible to prevent such a situation from occurring and to prevent loss of sales opportunities.

Effects of Third Example Embodiment

According to the configuration of the present example embodiment, a sales clerk can be made to notice a customer present in the blind spot region. Furthermore, there is also an effect of avoiding a customer from attempting shoplifting.

Fourth Example Embodiment

Another example embodiment of the disclosure will be described below.

Monitoring Device 220

FIG. 11 is a block diagram illustrating a configuration of a monitoring device 220 according to the present fourth example embodiment. As illustrated in FIG. 11, the monitoring device 220 includes a detection unit 221, an estimation unit 222, a determination unit 223, and a presentation unit 224.

For example, the detection unit 221 acquires an image of the inside of the monitoring area captured by a monitoring camera. The detection unit 221 detects a person from the acquired image.

The estimation unit 222 estimates a region being viewed by the person detected by the detection unit 221. The region being viewed by the person refers to a region included in the field of view of the person. The estimation unit 222 detects the line of sight of the person in the image using, for example, a widely known line-of-sight detection technology. Then, the estimation unit 222 calculates the field of view of the person, using the orientation of the detected line of sight of the person and the angle information on the field of view of an average human. The estimation unit 222 estimates a region included in the calculated field of view of the person, as a region being viewed by the person.

The determination unit 223 determines a region that requires special attention within the monitoring area, based on the region estimated by the estimation unit 222. The region that requires special attention is, for example, the blind spot region described in the first to third example embodiments.

The presentation unit 224 presents information indicating the region that requires special attention determined by the determination unit 223. A means for the presentation is not particularly limited. For example, the presentation unit 224 displays a map on which the region that requires special attention is indicated, on a display apparatus. Alternatively, the presentation unit 224 uses a warning light or a speaker to make a notification on the presence of the region that requires special attention.

Effects of Fourth Example Embodiment

According to the configuration of the present example embodiment, a region being viewed by a person is estimated, and the region that requires special attention within the monitoring area is determined. For example, in the monitoring area, a region that is not viewed by a person is determined to be the region that requires special attention. Then, information indicating the determined region that requires special attention is presented. This allows to present a region that is not fully monitored, that is, the region that requires special attention, to a person such as a commander or a security guard.

Fifth Example Embodiment

Another example embodiment of the disclosure will be described below.

Regarding Hardware Configuration

Figure 12:
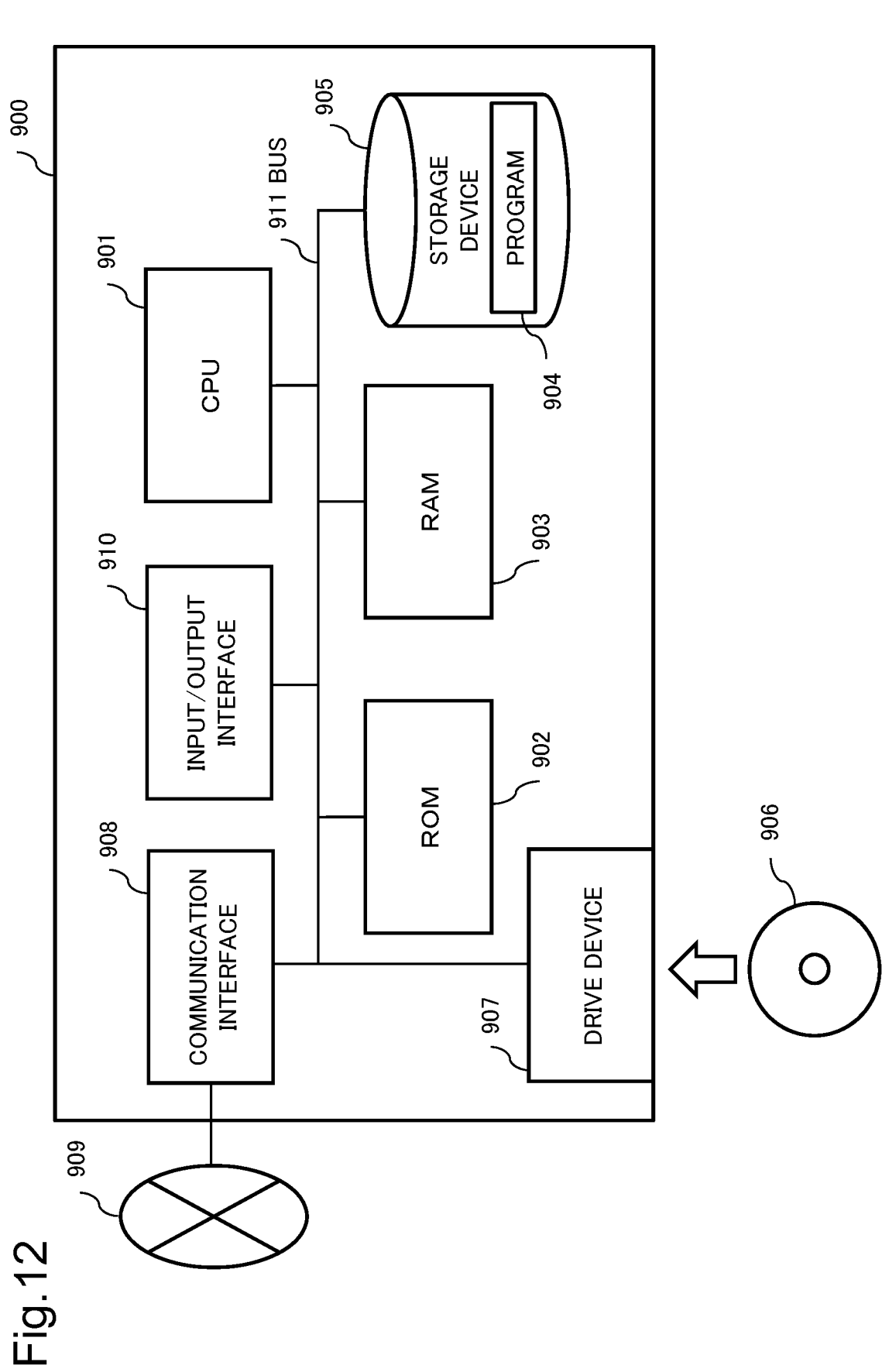
FIG. 12 is a diagram illustrating a hardware configuration of a device according to a fifth example embodiment.
Figure 13:
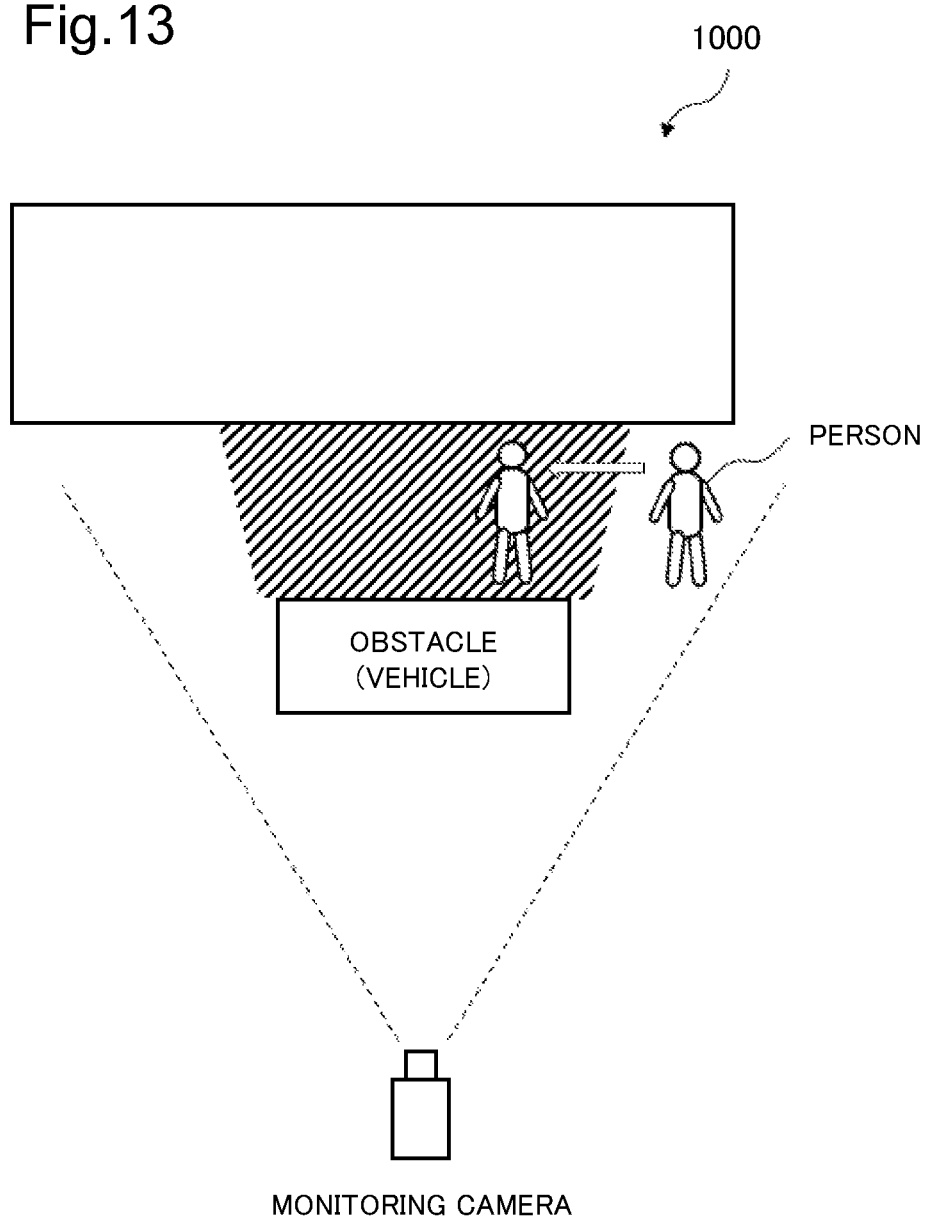
FIG. 13 is a diagram explaining related art.

In each example embodiment of the present disclosure, each constituent element of each device indicates a block in units of functions. Some or all of multiple constituent elements of each device may be achieved by any combination of a device 900 and a program as illustrated in FIG. 12, for example. FIG. 12 is a block diagram illustrating an example of a hardware configuration of the device 900 that achieves each constituent element of each device.

As illustrated in FIG. 12, the device 900 includes the following components as an example.

Central processing unit (CPU) 901
Read only memory (ROM) 902
Random access memory (RAM) 903
Program 904 that is loaded into RAM 903
Storage device 905 that stores program 904
Drive device 907 that performs reading and writing on recording medium 906
Communication interface 908 connected to communication network 909
Input/output interface 910 that inputs and outputs data
Bus 911 that connects between respective constituent elements Each constituent element of each device in each example embodiment is achieved by the CPU 901 acquiring and executing the program 904 that enables the functions of these constituent elements. The program 904 that enables the function of each constituent element of each device is stored in advance, for example, in the storage device 905 or the ROM 902, and is loaded into the RAM 903 and executed by the CPU 901 as necessary. The program 904 may be supplied to the CPU 901 via the communication network 909, or may be stored in advance in the recording medium 906 in such a way as to be supplied to the CPU 901 by the drive device 907 that read out the stored program.

Effects of Fifth Example Embodiment

According to the configuration of the present example embodiment, the device described in any one of the above example embodiments is achieved as hardware. Therefore, effects similar to the effects described in any of the above example embodiments can be obtained.

While the disclosure has been particularly shown and described with reference to example embodiments thereof, the disclosure is not limited to these example embodiments. It will be understood by those of ordinary skill in the art that various changes in form and details may be made therein without departing from the spirit and scope of the disclosure as defined by the claims.

Supplementary Note

Some or all of the above example embodiments can also be described as in the following supplementary notes, but are not restricted to the following.

Supplementary Note 1

A monitoring device including:
a detection unit that detects a person from an image;
an estimation unit that estimates a region that is being viewed by the detected person;
a determination unit that determines, based on the estimated region, a region that requires special attention within a monitoring area; and
a presentation unit that presents information indicating the determined region that requires special attention.

Supplementary Note 2

The monitoring device according to supplementary note 1, in which
the detection unit acquires the image from a monitoring camera that captures an image of the monitoring area.

Supplementary Note 3

The monitoring device according to supplementary note 1 or 2, in which
the detection unit detects a particular person from the image, and
the estimation unit estimates a region that is being viewed by the particular person, using a sensor carried or worn by the particular person.

Supplementary Note 4

The monitoring device according to any one of supplementary notes 1 to 3, in which
the detection unit further detects an object other than the person, and
the estimation unit determines a region within the monitoring area that is shielded from a line of sight of the person by the detected object, as not being viewed by the person.

Supplementary Note 5

The monitoring device according to any one of supplementary notes 1 to 4, in which
the determination unit determines a region that is out of a field of view of the person and also out of a field of view of a monitoring camera that captures an image of the monitoring area, as the region that requires special attention.

Supplementary Note 6

The monitoring device according to any one of supplementary notes 1 to 5, in which
the detection unit includes a tracking unit that track the person, and
the estimation unit estimates the region that is being viewed by the person, based on a result of tracking the person by the tracking unit.

Supplementary Note 7

The monitoring device according to any one of supplementary notes 1 to 6, further including a line-of-sight determination unit that determines a line of sight of the person detected by the detection unit, in which
the estimation unit estimates a field of view of the person, based on the determined line of sight of the person.

Supplementary Note 8

The monitoring device according to supplementary note 7, in which
the line-of-sight determination unit determines the line of sight of the person, using an image from which the person detected by the detection unit.

Supplementary Note 9

The monitoring device according to supplementary note 7, in which
the detection unit detects a particular person from the image, and
the line-of-sight determination unit determines a line of sight of the particular person, using an image captured by a device carried or worn by the particular person.

Supplementary Note 10

The monitoring device according to any one of supplementary notes 1 to 9, in which
the detection unit detects a particular person from the image,
the monitoring device further including a notification unit that notifies the particular person detected by the detection unit that the monitoring area contains the region that requires special attention.

Supplementary Note 11

The monitoring device according to any one of supplementary notes 1 to 10, in which
the presentation unit displays the region that requires special attention, on a display apparatus in an aspect different from aspects for other regions of the monitoring area.

Supplementary Note 12

A monitoring method including:
detecting a person from an image;
estimating a region that is being viewed by the detected person;
determining, based on the estimated region, a region that requires special attention within a monitoring area; and
presenting information indicating the determined region that requires special attention.

Supplementary Note 13

A program for causing a computer to execute:
detecting a person from an image;
estimating a region that is being viewed by the detected person;
determining, based on the estimated region, a region that requires special attention within a monitoring area; and
presenting information indicating the determined region that requires special attention.

This application is based upon and claims the benefit of priority from Japanese patent application No. 2019-003514, filed on Jan. 11, 2019, the disclosure of which is incorporated herein in its entirety by reference.

REFERENCE SIGNS LIST 1 monitoring system
10 monitoring camera
20 image processing device
21 person detection unit
22 line-of-sight determination unit
23 field-of-view estimation unit
24 blind spot region determination unit
25 notification unit
26 display control unit
28 presentation unit
29 tracking unit
30 wireless terminal
40 monitoring monitor
220 monitoring device
221 detection unit
222 estimation unit
223 determination unit
224 presentation unit

The invention claimed is:

1. A monitoring device comprising:
a memory storing instructions; and
at least one processor coupled to the memory and configured to execute the instructions to:
track a person from time-series images of a monitoring area captured by a surveillance camera;
acquire an image captured by a camera worn by the tracked person;
estimate a region within the monitoring area captured by the surveillance camera that is being viewed by the tracked person within a predetermined period, based on the image captured by the camera worn by the tracked person;
determine, based on the estimated region, a region that requires special attention within the monitoring area; and
present the image and information indicating the determined region that requires special attention.

2. The monitoring device according to claim 1, wherein the at least one processor is configured to execute the instructions to further
display the image and the information on a monitor.

3. The monitoring device according to claim 1, wherein the at least one processor is configured to execute the instructions to further
display the time-series images and the image on a monitor.

4. The monitoring device according to claim 1, wherein the at least one processor is configured to execute the instructions to further
notify a terminal including the camera worn by the tracked person of the information.

5. The monitoring device according to claim 1, wherein the at least one processor is configured to execute the instructions to further
track a particular person from time-series images; and
when the particular person is present in the determined region, notify a terminal including the camera worn by the tracked person of information relating to tracking the particular person.

6. A monitoring method performed by a computer and comprising:

tracking a person from time-series images of a monitoring area captured by a surveillance camera;

acquiring an image captured by a camera worn by the tracked person;

estimating a region within the monitoring area captured by the surveillance camera that is being viewed by the tracked person within a predetermined period, based on the image captured by the camera worn by the tracked person;

determining, based on the estimated region, a region that requires special attention within the monitoring area; and presenting the image and information indicating the determined region that requires special attention.

7. The monitoring method according to claim 6, comprising:

displaying the image and the information on a monitor.

8. The monitoring method according to claim 6, comprising:

displaying the time-series images and the image on a monitor.

9. The monitoring method according to claim 6, comprising:

notifying a terminal including the camera worn by the tracked person of the information.

10. The monitoring method according to claim 6, comprising:

tracking a particular person from the time-series images; and when the particular person is present in the determined region, notifying a terminal including the camera worn by the tracked person of information relating to tracking the particular person.

11. A non-transitory recording medium storing a program for causing a computer to execute:

tracking a person from time-series images of a monitoring area captured by a surveillance camera;

acquiring an image captured by a camera worn by the tracked person;

estimating a region within the monitoring area captured by the surveillance camera that is being viewed by the tracked person within a predetermined period, based on the image captured by the camera worn by the tracked person;

determining, based on the estimated region, a region that requires special attention within the monitoring area; and presenting the image and information indicating the determined region that requires special attention.

12. The non-transitory recording medium according to claim 11, wherein the program causes the computer to execute:

displaying the image and the information on a monitor.

13. The non-transitory recording medium according to claim 11, wherein the program causes the computer to execute:

displaying the time-series images and the second image on a monitor.

14. The non-transitory recording medium according to claim 11, wherein the program causes the computer to execute:

notifying a terminal including the camera worn by the tracked person of the information.

15. The non-transitory recording medium according to claim 11, wherein the program causes the computer to execute:

tracking a particular person from the time-series images; and when the particular person is present in the determined region, notifying a terminal including the camera worn by the tracked person of information relating to tracking the particular person.

\* \* \* \* \*